United States Patent
Suciu et al.

(10) Patent No.: US 10,287,024 B2
(45) Date of Patent: May 14, 2019

(54) DIRECT DRIVE AFT FAN ENGINE

(71) Applicant: United Technologies Corporation, Farmington, CT (US)

(72) Inventors: Gabriel L. Suciu, Glastonbury, CT (US); Jesse M. Chandler, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 365 days.

(21) Appl. No.: 15/228,359

(22) Filed: Aug. 4, 2016

(65) Prior Publication Data

US 2018/0037331 A1    Feb. 8, 2018

(51) Int. Cl.

| | | |
|---|---|---|
| *B64D 27/14* | (2006.01) | |
| *B64D 33/04* | (2006.01) | |
| *F01D 5/02* | (2006.01) | |
| *F01D 9/02* | (2006.01) | |
| *F02K 3/062* | (2006.01) | |
| *F04D 29/32* | (2006.01) | |
| *F02C 3/10* | (2006.01) | |
| *B64D 33/02* | (2006.01) | |

(52) U.S. Cl.
CPC .............. *B64D 27/14* (2013.01); *B64D 33/04* (2013.01); *F01D 5/02* (2013.01); *F01D 9/02* (2013.01); *F02C 3/10* (2013.01); *F02K 3/062* (2013.01); *F04D 29/321* (2013.01); *F04D 29/325* (2013.01); *B64D 2033/0226* (2013.01); *F05D 2220/323* (2013.01); *F05D 2240/60* (2013.01)

(58) Field of Classification Search
CPC ........... B64D 27/14; B64D 33/04; F01D 5/02; F01D 9/02; F02C 3/10; F02K 3/062
See application file for complete search history.

(56) References Cited

U.S. PATENT DOCUMENTS

| | | | | |
|---|---|---|---|---|
| 3,054,577 | A | * 9/1962 | Wolf | ...................... B64D 27/12 |
| | | | | 244/110 B |
| 3,117,748 | A | * 1/1964 | Gerlaugh | ............ B64C 29/0016 |
| | | | | 244/15 |
| 5,161,369 | A | 11/1992 | Williams | |
| 8,516,789 | B2 | 8/2013 | Kupratis | |
| 8,701,385 | B2 | 4/2014 | Clemen | |
| 9,297,270 | B2 * | 3/2016 | Suciu | ...................... F01D 15/12 |
| 9,637,217 | B2 * | 5/2017 | Marrinan | .................. B64C 1/16 |
| 2005/0109012 | A1 | 5/2005 | Johnson | |
| 2007/0209368 | A1 | 9/2007 | Giffin et al. | |
| 2012/0128487 | A1 * | 5/2012 | Eames | .................. B64C 11/346 |
| | | | | 416/1 |
| 2015/0013307 | A1 | 1/2015 | Burghardt | |

(Continued)

FOREIGN PATENT DOCUMENTS

GB        1250010        10/1971

OTHER PUBLICATIONS

The Extended European Search Report for EP Application No. 17185005.0, dated Jan. 4, 2018.

*Primary Examiner* — Justin M Benedik
(74) *Attorney, Agent, or Firm* — Carlson, Gaskey & Olds, P.C.

(57) ABSTRACT

An aircraft engine includes a gas generator, a turbine fluidly connected to the gas generator, and a fan connected to the turbine via a shaft. The fan is positioned aft of the turbine, and the shaft is at least partially disposed in a fan inlet flowpath.

20 Claims, 4 Drawing Sheets

(56) References Cited

U.S. PATENT DOCUMENTS

| | | | |
|---|---|---|---|
| 2015/0284067 A1 | 10/2015 | Suciu et al. | |
| 2015/0291285 A1* | 10/2015 | Gallet | F01D 13/02 |
| | | | 415/60 |
| 2017/0314509 A1* | 11/2017 | Laricchiuta | F02C 3/04 |
| 2017/0361939 A1* | 12/2017 | Negulescu | B64C 1/16 |
| 2018/0093776 A1* | 4/2018 | Ramakrishnan | B64D 29/04 |

* cited by examiner

DIRECT DRIVE AFT FAN ENGINE

STATEMENT REGARDING FEDERALLY SPONSORED RESEARCH OR DEVELOPMENT

The subject of this disclosure was made with government support under Contract No.: NND15AC56C awarded by NASA. The government therefore may have certain rights in the disclosed subject matter.

TECHNICAL FIELD

The present disclosure relates generally to aft fan aircraft, and specifically to a direct drive engine configuration for an aft fan aircraft.

BACKGROUND

Existing aircraft engines typically include a fan, positioned forward of a turbine core, with the turbine core driving the fan rotation by expanding gasses compressed within a compressor section across a turbine section. Rotation of the fan drives air along a bypass flowpath and generates thrust allowing the aircraft to operate.

In a typical example, gas turbine engines of this type are mounted to, or in, a wing of the aircraft, with each wing having complimentary engines. In alternative examples, the engines can be mounted to a tail, or a tail region, of the aircraft.

SUMMARY OF THE INVENTION

In one exemplary embodiment an aircraft engine includes a gas generator, a turbine fluidly connected to the gas generator, a fan connected to the turbine via a shaft, the fan being positioned aft of the turbine, and the shaft being at least partially disposed in a fan inlet flowpath.

Another example of the above described aircraft engine further includes a turbine exhaust flowpath adjacent to the fan inlet flowpath.

In another example of any of the above described aircraft engines the turbine exhaust flowpath is at least partially defined by a manifold.

In another example of any of the above described aircraft engines the manifold surrounds the shaft at an end of the manifold.

In another example of any of the above described aircraft engines the manifold defines an exhaust port adjacent the fan at an end of the manifold.

Another example of any of the above described aircraft engines further includes a sleeve at least partially surrounding the shaft.

In another example of any of the above described aircraft engines the sleeve is at least partially disposed in the fan inlet flowpath.

In another example of any of the above described aircraft engines the sleeve includes an aerodynamic profile relative to an expected direction of fluid flow through the fan inlet flowpath.

In another example of any of the above described aircraft engines the gas generator defines a burst zone, and wherein the burst zone is characterized by a lack of intersection with a second aircraft engine.

In another example of any of the above described aircraft engines the fan is a direct drive fan.

In another example of any of the above described aircraft engines the gas generator is a compressor.

In another example of any of the above described aircraft engines a fluid flowpath connecting the gas generator to the turbine section includes a bend.

In one exemplary embodiment an aircraft includes a fuselage, and a first aircraft engine including a first thrust-producing fan mounted to a tail section of the fuselage, a first gas generator fluidly connected to a first turbine section and operable to provide compressed gas to the first turbine section, a first shaft mechanically connecting the first turbine section to the thrust-producing fan, such that rotation of the first turbine section is translated to the first thrust-producing fan, and a first fan inlet flowpath at least partially defined by the fuselage, wherein the first shaft is at least partially disposed in the first fan inlet flowpath.

Another example of the above described aircraft further includes a second aircraft engine having a second thrust-producing fan mounted to the tail second of the fuselage, a second gas generator fluidly connected to a second turbine section and operable to provide compressed gas to the second turbine section, a second shaft mechanically connecting the second turbine section to the second thrust-producing fan, such that rotation of the second turbine section is translated to the second thrust-producing fan and a second fan inlet flowpath at least partially defined by the fuselage, wherein the second shaft is at least partially disposed in the second fan inlet flowpath.

In another example of any of the above described aircraft each of the gas generator and the second gas generator defines a corresponding burst zone, and a burst zone of the first gas generator does not intersect the second aircraft engine, and wherein a burst zone of the second gas generator does not intersect the first aircraft engine.

Another example of any of the above described aircraft further includes a flowpath bend transmitting and turning a compressed gas output of the first gas generator to an input of the first turbine section.

Another example of any of the above described aircraft further includes a sleeve disposed at least partially about the first shaft.

In another example of any of the above described aircraft the sleeve comprises an aerodynamic profile, relative to an expected direction of fluid flow through the first fan inlet flowpath.

Another example of any of the above described aircraft further includes an exhaust manifold connecting an output of the first turbine section to an aft exhaust port, wherein the aft exhaust port is adjacent the first thrust-producing fan.

In another example of any of the above described aircraft the first thrust-producing fan is a direct drive fan.

These and other features of the present invention can be best understood from the following specification and drawings, the following of which is a brief description.

DETAILED DESCRIPTION OF AN EMBODIMENT

For certain aircraft applications, providing thrust-producing fans on top of the fuselage in a tail region of the aircraft can provide more desirable properties than traditional forward fan gas turbine engines. By way of example, mounting thrust-producing fans in this manner can allow the fans to pull in air from a boundary layer surrounding the aircraft fuselage, thereby reducing drag on the aircraft and increasing the thrust produced by the fans.

Figure 1:
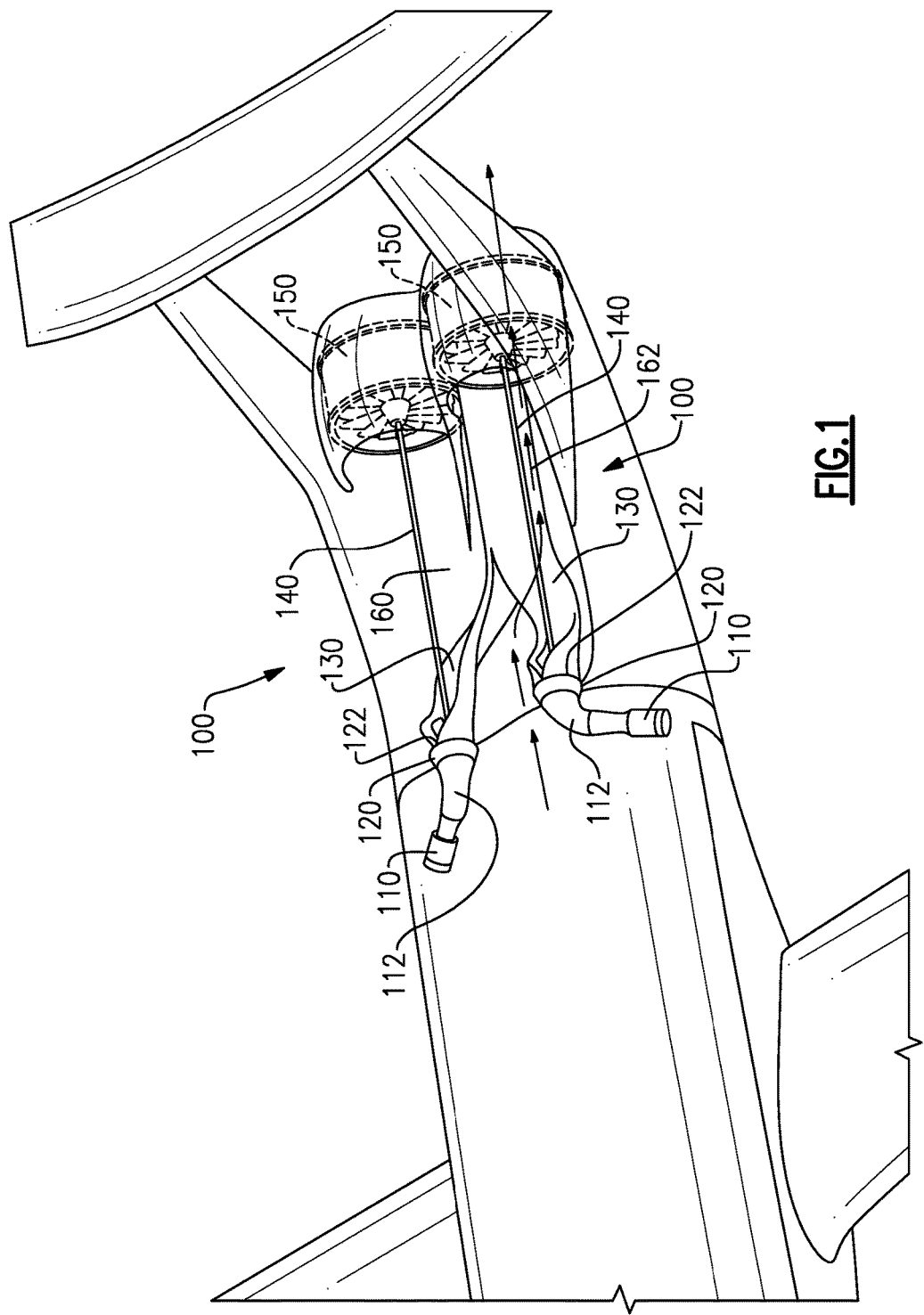
FIG. 1 schematically illustrates a pair of direct drive aft fan engines.

FIG. 1 schematically illustrates a pair of direct drive aft fan engines 100 with fans 150 mounted on top of a fuselage in a tail region of an aircraft. Each of the engines 100 includes a gas generator 110. The gas generators 110 are fluidly connected to a corresponding turbine 120. Expansion of the gas across the turbine 120 drives the turbine 120 to rotate. The turbines 120 include an exhaust gas exit 122 that exhausts expanded gasses into an exhaust manifold 130. The exhaust manifold 130 defines an exhaust flowpath and transmits the exhausted gasses to an aft exit.

Each of the turbines 120 drives rotation of a corresponding long shaft 140. The long shafts 140 connect to, and drive rotation of, the thrust-producing fans 150. The thrust-producing fans 150 are positioned aft of the turbines 120. An aerodynamic indention 160 in the aircraft fuselage defines a fan inlet flowpath 162. The long shaft 140 passes through the fan inlet flowpath 162, and is connected to a center hub of the corresponding fan 150.

In some examples, the gas generator 110, is a compressor and is driven to generate a compressed gas. The compressed gas is provided to the turbine 120 through a bend 112. The compressed gas is expanded across the stages of the turbine 120, which drives rotation of the turbine 120. Rotation of the turbine 120, in turn rotates the long shaft 140, and drives rotation of the corresponding fan 150.

In order to prevent interference between gasses exhausted from the turbine exhaust gas exit 122, and gas flowing through the fan inlet flowpath 162, the exhaust manifold 130 encircles the shaft 140 at the exhaust gas exit 122, and unwraps from around the shaft 140 to run adjacent to the fan inlet flowpath 162 along the majority of the inlet flowpath 162. This configuration allows the exhaust manifold 130 to direct exhaust gasses to aft of the fans 150, while simultaneously providing minimal impact on the air passing through the fan inlet flowpath 162. In some examples, the exhaust manifold 130 is aerodynamically shaped, relative to fluid flow through the fan inlet flowpath 162, thereby further minimizing the impact on the fluid flow to the fans 150.

Figure 2:
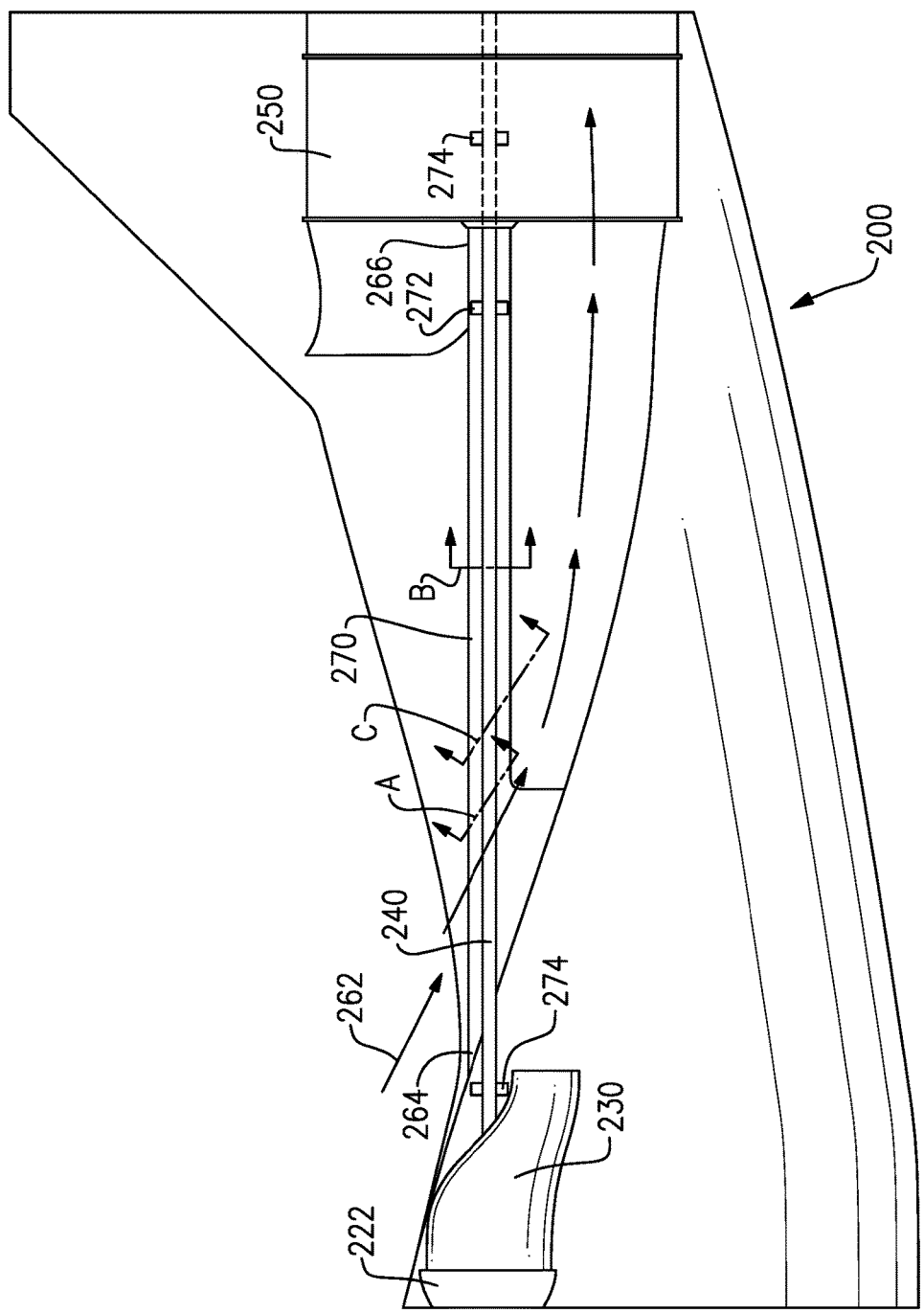
FIG. 2 schematically illustrates a fan shaft configuration of an exemplary direct drive aft fan engine.

With continued reference to FIG. 1, and with like numerals indicating like elements, FIG. 2 schematically illustrates a side view of a fan shaft configuration 200 of an exemplary direct drive aft fan engine, such as the direct drive aft fan engine 100 of FIG. 1. As with the engine of FIG. 1, a turbine exhaust 222 exhausts expanded turbine gasses into an exhaust manifold 230. The exhaust manifold 230 unwraps from around a long shaft 140, and proceeds adjacent to a fan inlet flowpath 262. In order to protect the shaft 240 from debris, and other materials in the fan inlet flowpath 262, the portion of the shaft 240 that passes through the fan inlet flowpath 262 is encased in a sleeve 270. In addition to protecting the shaft 240 from debris, and other materials in the fan inlet flowpath 262, the sleeve 270 operates to protect the shaft 240 from weather, and environmental hazards, such as lightning or hail.

In the illustrated example of FIG. 2, the sleeve 270 fully encases the portion of the shaft 240 passing through the fan inlet flowpath 262. In alternative examples, the sleeve 270 can encase only a partial length of the shaft 240. In such an example, the sleeve 270 fully encases the shaft 240 at a forward most end 264 of the fan inlet flowpath 262 and does not encase the shaft 240 and an aft most end 266 of the fan inlet flowpath 262.

In order to support the shaft 240 within the sleeve 270, at least one bearing 272 is included within the sleeve 270. Further, to support and stabilize the shaft 240, bearings 274 are positioned at the forward end of the shaft 240 within the aircraft fuselage and at the connection between the shaft 240 and the fan 250. Each of the bearings 272, 274 maintain the relative position of the shaft 240, while at the same time allowing the shaft 240 to freely rotate.

In order to minimize the impact that the sleeve 270 has on fluid entering the fan inlet flowpath 262, the sleeve 270 includes an aerodynamic profile, such as a teardrop or airfoil shape, along the expected direction of fluid flow into the fan inlet flowpath 262. By way of example, the aerodynamic profile can be along planes A, B, C, or any similar planar line.

Figure 3:
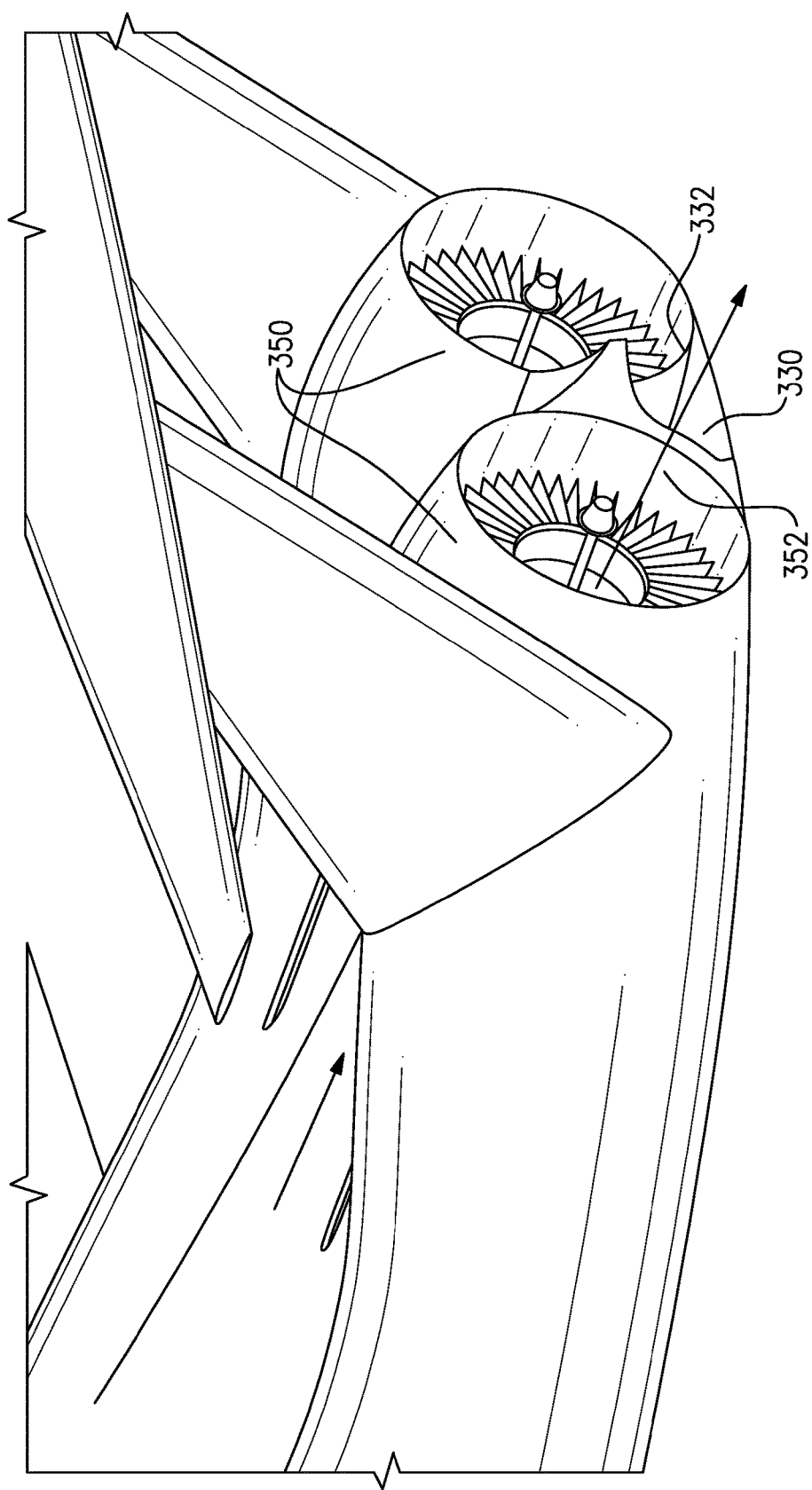
FIG. 3 schematically illustrates an isometric aft view of a direct drive aft fan engine configuration.
Figure 4:
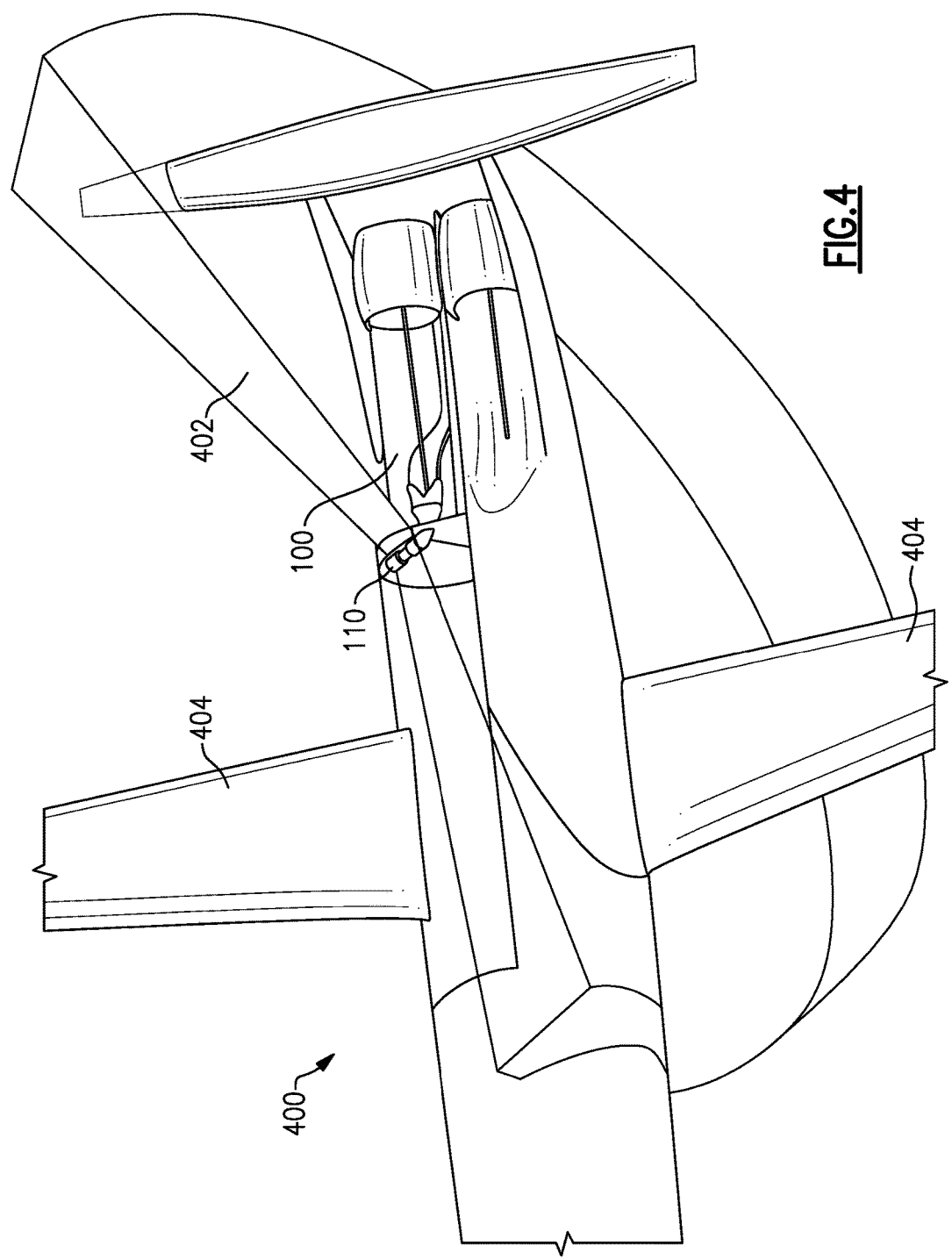
FIG. 4 schematically illustrates a pair of direct drive aft fan engines including an exemplary burst zone.

With continued reference to FIGS. 1 and 2, and with like numerals indicating like elements, FIG. 4 isometrically illustrates the engine configuration of FIG. 1 from an aft, or rear, view. As visible in FIG. 3, the exhaust manifold 330 includes a exhaust exit port 332. The exhaust exit port 332 is adjacent to both fans 350 and expels exhausted turbine gas aft of the fans 350.

The exhaust exit port 332, as well as the portion of the manifold 330 leading up to the exhaust port 332 is oriented and configured to expel the exhaust gas in the same direction as a gas stream 352 exiting the fans 350. In alternative examples, the exhaust port 332 can be oriented to expel gas in a direction away from the gas stream 352 exiting the fans 350.

With continued reference to FIGS. 1-3, FIG. 4 schematically illustrates an aircraft 400 including the engine 100 configuration of FIG. 1. As can be appreciated by those of skill in the art, gas generators and turbines, as with any rotational machine, have failure modes corresponding to mechanical breakage within the component. One such failure mode is referred to as a burst. A burst happens when a mechanical failure within the rotating component causes one or more pieces of the rotating component to be expelled outward from the rotating component.

Illustrated in the configuration of FIG. 4 is a burst zone 402 of one gas generator 110 in the engine 100 configuration. While illustrated as a partial circle for explanatory effect, one of skill in the art having the benefit of this disclosure, will appreciate that the burst zone 402 extends in a full circle about the gas generator 110 in a practical implementation. The portions of the aircraft 400 covered by the burst zone 402 are the portions where components from the gas generator 110 could be expelled in the case of a burst, and are susceptible to damage resulting from a burst. The orientation of the burst zone 402, relative to a centerline axis of the gas generator 110, is dependent on the orientation of the centerline axis of the gas generator 110.

In order to ensure that the burst zone 402 does not intersect with important aircraft components, such as a wing 404, or the other engine 100 configuration, the gas generator 110 is angled relative to the direction of flow along the fan inlet fluid flowpath 162 (illustrated in FIG. 1). The specific angle of the gas generator 110, relative to the axis of the corresponding fan 150, to achieve a desirable burst zone 402/aircraft 400 intersection can be determined by one of skill in the art having the benefit of this disclosure, and is dependent on the specific configuration of the aircraft 400, and the gas generator 110.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An aircraft engine comprising:
a gas generator;
a turbine fluidly connected to the gas generator;
a fan connected to said turbine via a shaft, the fan being positioned aft of the turbine and being in-line with the turbine; and
the shaft being at least partially disposed in a fan inlet flowpath.

2. The aircraft engine of claim 1, further comprising a turbine exhaust flowpath adjacent to said fan inlet flowpath.

3. The aircraft engine of claim 2, wherein the turbine exhaust flowpath is at least partially defined by a manifold.

4. The aircraft engine of claim 3, wherein the manifold surrounds the shaft at an end of the manifold.

5. The aircraft engine of claim 3, wherein the manifold defines an exhaust port adjacent said fan at an aft end of the manifold.

6. The aircraft engine of claim 1, further comprising a sleeve at least partially surrounding the shaft.

7. The aircraft engine of claim 6, wherein the sleeve is at least partially disposed in the fan inlet flowpath.

8. The aircraft engine of claim 6, wherein the sleeve includes an aerodynamic profile relative to an expected direction of fluid flow through the fan inlet flowpath.

9. An aircraft engine comprising:
a gas generator;
a turbine fluidly connected to the gas generator;
a fan connected to said turbine via a shaft, the fan being positioned aft of the turbine; and
the shaft being at least partially disposed in a fan inlet flowpath, wherein said gas generator defines a burst zone, and wherein the burst zone is characterized by a lack of intersection with a second aircraft engine.

10. The aircraft engine of claim 1, wherein the fan is a direct drive fan.

11. The aircraft engine of claim 1, wherein the gas generator is a compressor.

12. The aircraft engine of claim 1, wherein a fluid flowpath connecting the gas generator to the turbine section includes a bend.

13. An aircraft comprising
a fuselage; and
a first aircraft engine including
a first thrust-producing fan mounted to a tail section of said fuselage;
a first gas generator fluidly connected to a first turbine section and operable to provide compressed gas to said first turbine section;
a first shaft mechanically connecting said first turbine section to said thrust-producing fan, such that rotation of the first turbine section is translated to the first thrust-producing fan, wherein the first shaft is in-line with the first turbine section; and
a first fan inlet flowpath at least partially defined by said fuselage, wherein said first shaft is at least partially disposed in said first fan inlet flowpath.

14. The aircraft of claim 13, further comprising a second aircraft engine having a second thrust-producing fan mounted to said tail second of said fuselage, a second gas generator fluidly connected to a second turbine section and operable to provide compressed gas to said second turbine section, a second shaft mechanically connecting said second turbine section to said second thrust-producing fan, such that rotation of the second turbine section is translated to the second thrust-producing fan and a second fan inlet flowpath at least partially defined by said fuselage, wherein said second shaft is at least partially disposed in said second fan inlet flowpath.

15. The aircraft of claim 14, wherein each of said gas generator and said second gas generator defines a corresponding burst zone, and a burst zone of said first gas generator does not intersect said second aircraft engine, and wherein a burst zone of said second gas generator does not intersect said first aircraft engine.

16. The aircraft engine of claim 13, further comprising a flowpath bend transmitting and turning a compressed gas output of the first gas generator to an input of the first turbine section.

17. The aircraft of claim 13, further comprising a sleeve disposed at least partially about said first shaft.

18. The aircraft of claim 17, wherein said sleeve comprises an aerodynamic profile, relative to an expected direction of fluid flow through the first fan inlet flowpath.

19. The aircraft of claim 13, further comprising an exhaust manifold connecting an output of said first turbine section to an aft exhaust port, wherein the aft exhaust port is adjacent the first thrust-producing fan.

20. The aircraft of claim 13, wherein the first thrust-producing fan is a direct drive fan.

* * * * *